US008354591B2

(12) United States Patent
Hirose et al.

(10) Patent No.: US 8,354,591 B2
(45) Date of Patent: Jan. 15, 2013

(54) SUPERCONDUCTING CABLE

(75) Inventors: Masayuki Hirose, Osaka (JP); Ryosuke Hata, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 13/011,661

(22) Filed: Jan. 21, 2011

(65) Prior Publication Data

US 2011/0203827 A1    Aug. 25, 2011

Related U.S. Application Data

(62) Division of application No. 11/661,958, filed as application No. PCT/JP2006/307579 on Apr. 10, 2006, now abandoned.

(51) Int. Cl.
H01B 12/00 (2006.01)
(52) U.S. Cl. .................... 174/125.1; 174/15.4
(58) Field of Classification Search .......... None
See application file for complete search history.

(56) References Cited

U.S. PATENT DOCUMENTS

| 4,845,308 | A | * | 7/1989 | Womack et al. ............. 174/15.4 |
| 5,932,523 | A | | 8/1999 | Fujikami et al. |
| 5,991,647 | A | | 11/1999 | Brockenborough et al. |
| 6,835,892 | B2 | | 12/2004 | Nassi et al. |
| 7,279,686 | B2 | | 10/2007 | Schneiker |

FOREIGN PATENT DOCUMENTS

| GB | 1 450 975 A | 9/1976 |
| JP | 48-044476 U | 6/1973 |
| JP | 57-191906 | 11/1982 |
| JP | 64-003907 | 1/1989 |
| JP | 02-299108 | 12/1990 |
| JP | 04-000774 A | 1/1992 |
| JP | 08-212844 A | 8/1996 |
| JP | 2002-140944 | 5/2002 |
| JP | 2006-032186 A | 2/2006 |
| RU | 2087956 C1 | 8/1997 |
| RU | 2099806 C1 | 12/1997 |
| RU | 2255164 C1 | 6/2005 |
| SU | 1438501 A1 | 1/1996 |

OTHER PUBLICATIONS

Office Action dated Aug. 11, 2010 from related U.S. Appl. No. 11/661,958.
Office Action dated Nov. 24, 2010 from related U.S. Appl. No. 11/661,958.

(Continued)

Primary Examiner — Ishwarbhai Patel
(74) Attorney, Agent, or Firm — Foley & Lardner LLP

(57) ABSTRACT

Provided is a superconducting cable capable of maintaining a predetermined thermal insulation property without having a vacuum thermal insulation structure. The superconducting cable of the present invention includes: a cable unit 100, in which a core having a superconductor layer and an electrical insulation layer is housed in a core-housing pipe; a thermal insulation member 200 which is provided outside the cable unit and maintained in a non-vacuum state; and a sealing member for preventing the permeation of moisture into the thermal insulation member. By equipping the outside of the cable unit with the thermal insulation member 200 which is maintained in a non-vacuum state, it is made possible to maintain the predetermined thermal insulation property without having a vacuum thermal insulation structure.

20 Claims, 4 Drawing Sheets

OTHER PUBLICATIONS

Notice of Preliminary Rejection for Application No. 10-2007-7005942 from KIPO, mail date Feb. 17, 2012, 10 pages.

Third Office Action for Chinese Patent Application No. 200680027084.1 from SIPO of the People's Republic of China, dated Feb. 16, 2012, 10 pages.

Decision on Grant dated Aug. 5, 2009 from related Russian patent application 2007139589/09.

Notification of Reasons for Rejection dated Feb. 17, 2010 from related Japanese application No. 2005-043021.

Partial English translation of Notification of Reasons for Rejection dated Feb. 17, 2010 from related Japanese application No. 2005-043021.

PCT publication of search report for PCT/JP2006/307579 dated Oct. 18, 2007.

Fourth Office Action from corresponding Chinese Patent application No. 20060027084.1 from SIPO, with English translation, dated Jun. 14, 2012.

\* cited by examiner

SUPERCONDUCTING CABLE

CROSS-REFERENCE TO RELATED PATENT APPLICATIONS

Japan Priority Application 2004-302243, filed Oct. 15, 2004 including the specification, drawings, claims and abstract, is incorporated herein by reference in its entirety. Japan Priority Application 2005-043021, filed Feb. 18, 2005 including the specification, drawings, claims and abstract, is incorporated herein by reference in its entirety. This application is a Divisional of U.S. application Ser. No. 11/661,958, filed Mar. 2, 2007 (which is a National Stage application of PCT/JP2006/307579, filed Apr. 10, 2006), incorporated herein by reference in its entirety.

BACKGROUND OF THE INVENTION (a) Field of the Invention

The present invention relates to a superconducting cable. Particularly, the invention relates to a superconducting cable that does not have a vacuum thermal insulation structure, or a superconducting cable that has a vacuum thermal insulation structure and that can maintain the thermal insulation performance even if the vacuum condition is destroyed.

(b) Description of Related Art

The superconducting cable as shown in FIG. 8 is a proposed conventional superconducting cable. FIG. 8 is a sectional view of a three core-in-one type superconducting cable having a structure in which three cores 110 are housed in a thermal insulation pipe 600.

A cable core 110 is equipped with a former 111, a superconductor layer 112, an electrical insulation layer 113, a shielding layer 114, and a protective layer 115, in an enumerated order from the center thereof. The conductor layer 112 is formed by spirally winding superconducting wires in multiple layers on the former 111. Generally, a superconducting wire has a structure of tape-like shape in which a plurality of filaments consisting of an oxide superconducting material are arranged in a matrix such as a silver sheath. The insulation layer 113 is formed by winding an insulation paper such as a semisynthetic insulation paper. The shielding layer 114 is formed by spirally winding a superconducting wire, which is similar to the conductor layer 112, on the electrical insulation layer 113. An insulation paper or the like is used as the protective layer 115.

On the other hand, a thermal insulation pipe 600 is structured such that a thermal insulation material (not illustrated) is arranged between the double pipes consisting of an inner pipe 610 and an outer pipe 620, the inside of the double pipe is evacuated. An anticorrosion layer 630 is formed outside the thermal insulation pipe 600. Furthermore, the space existing inside the former 111 (in the case where the former is hollow) and a space between the inner pipe 610 and the cores 110 are filled with a coolant such as liquid-nitrogen or the like which circulates therein so that the thermal insulation pipe may be in a usable condition in a state of the insulation layer 113 being impregnated with the coolant.

[Patent document 1] Japanese Patent Application Publication No. 2002-140944 (FIG. 2)

However, there have been the following problems with respect to the above-mentioned superconducting cable.

(1) The vacuum thermal insulation structure needed for the superconducting cable results in a large-sized cable. In order to make a vacuum thermal insulation structure, it is necessary to use a thermal insulation pipe having a double pipe structure and to evacuate the space between the inner and the outer pipes of the thermal insulation pipe. Therefore, the thickness of the thermal insulation pipe increases, and particularly the outer diameter of the superconducting cable becomes large-sized. Accordingly, the manufacturing cost of the superconducting cable becomes high.

(2) The maintenance and control of the vacuum performance of the thermal insulation pipe are complex. Using an evacuated thermal insulation pipe having a double pipe structure requires the maintenance and control of the vacuum performance in the manufacture, construction and operation steps of the superconducting cable. Particularly, when a malfunction occurs to the vacuum performance of the thermal insulation pipe, it takes a large amount of time to recover the pre-determined vacuum condition once again. Depending on the conditions, it may be difficult to recover the pre-determined vacuum condition within a given period of time, which might result in failure of maintaining the coolant temperature, thereby causing a lack of a power transmission property.

BRIEF SUMMARY OF THE DISCLOSURE

The present invention was accomplished in view of the above-mentioned situation, and the main object of the invention is to provide a superconducting cable which is capable of maintaining a predetermined thermal insulation property without having a vacuum thermal insulation structure.

Another object of the present invention is to provide a superconducting cable having a vacuum thermal insulation structure and capable of maintaining a predetermined thermal insulation property even if the vacuum condition is destroyed.

The present invention achieves the above-mentioned objects by using a thermal insulation member other than the vacuum thermal insulation.

A superconducting cable of the present invention is characterized in that the cable comprises a cable unit, a thermal insulation member, and a sealing member: the cable unit is composed of a core, which has a superconductor layer and an electrical insulation layer, and a core-housing pipe for housing the core; the thermal insulation member is provided outside the cable unit and maintained in a non-vacuum state; and the sealing member prevents the permeation of moisture into the thermal insulation member.

By arranging the thermal insulation member of non-vacuum condition outside the cable unit, a predetermined thermal insulation property can be maintained without adopting a vacuum thermal insulation structure. By providing the thermal insulation member with a sealing member, it is made possible to prevent moisture from permeating into the thermal insulation member and to maintain the thermal insulation property thereof.

DETAILED DESCRIPTION OF PREFERRED EMBODIMENTS

Figure 1:
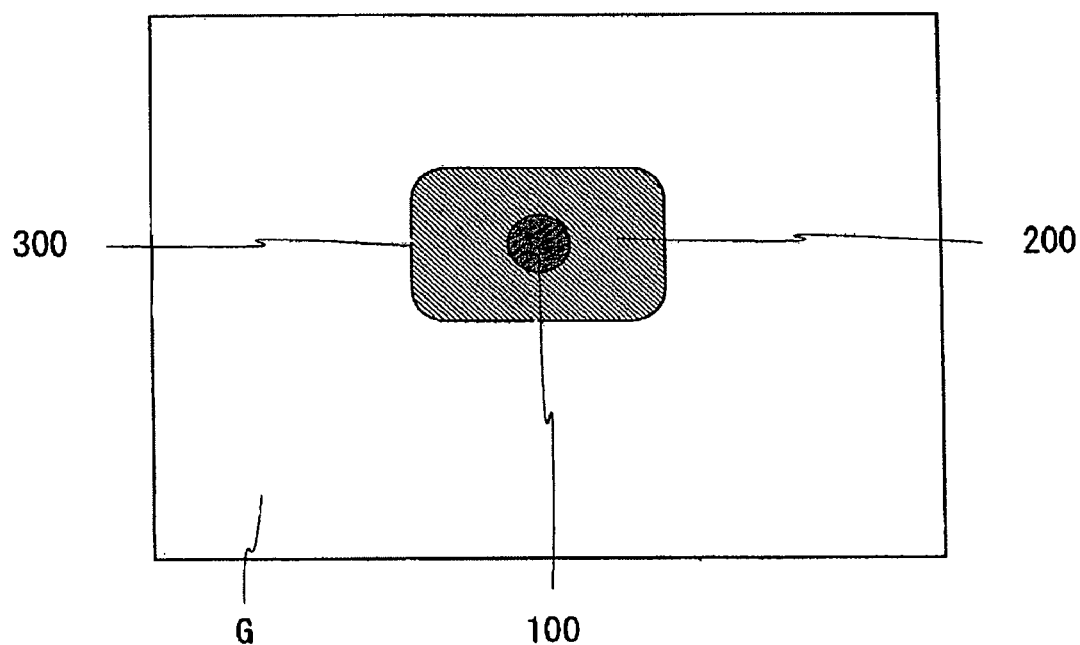
FIG. 1 is a schematic drawing showing the underground installation conditions of a superconducting cable of the present invention of an Example 1.

Hereinafter, the superconducting cable of the present invention will be described in more detail.

The superconducting cable of the present invention has a cable unit, a thermal insulation member maintained in a non-vacuum condition, and a sealing member for preventing the permeation of moisture into the thermal insulation member.

<Cable Unit>

The cable unit consists of a core and a core-housing pipe which houses the core. The core has at least a superconductor layer and an electrical insulation layer. Typically, the core is equipped with a former, a superconductor layer, an electrical insulation layer, a shielding layer, and a protective layer in the enumerated order from the center. The shielding layer may also be comprised of a superconducting wire.

The former which is used for maintaining the given shape of a superconductor layer may be of pipe-like shape, or may be made of stranded wires. The suitable material for the former is, for example, a non-magnetic metallic material such as copper or aluminum. In the case of a former having a pipe-like shape, it is possible to use the inside of the former as a channel of a coolant.

The superconductor layer is formed by, for example, spirally winding the wires made of a superconducting material around the former. A superconducting wire is, for example, structured in a tape-like shape such that a plurality of filaments consisting of Bi-2223 oxide superconducting material are arranged in a matrix of silver sheath. The winding of the superconducting wire may be made either in a single layer or in multiple layers. In the case of multiple layers, an inter-level isolation layer may be provided. The inter-level isolation layer may be provided, for example, by winding an insulation paper such as kraft paper, or winding a semisynthetic insulating paper such as PPLP (registered trademark, made by Sumitomo Electric Industries, Ltd.).

The electrical insulation layer is formed preferably by winding an insulation paper such as a semi-synthetic paper, e.g., PPLP (registered trademark, from Sumitomo Electric Industries, Ltd.) which is made by laminating polypropylene and kraft paper, or winding an insulation paper such as kraft paper. Also, a semiconductive layer may be formed at least at one side of the electrical insulation layer, that is, between the conductor layer and the electrical insulation layer, or between the electrical insulation layer and the shielding layer. By forming an inner semiconductive layer (i.e., the former case), or an outer semiconductive layer (i.e., the latter case), the adhesion between the conductor layer and the electrical insulation layer or between the electrical insulation layer and the shielding layer is enhanced, and the deterioration due to the occurrence of partial electrical discharge or the like is restrained.

Also, it is preferable to provide a shielding layer outside the electrical insulation layer. The shielding layer may be formed by an electrical conducting material, and it is preferable that the same kind of superconducting wire as that of the conductor layer be wound around the electrical insulation layer in order to form the shielding layer. Using a superconducting wire for a shielding layer makes it possible to restrain an electric current having an opposite phase relative to the conductor electric current from flowing into the shielding layer and to restrain a magnetic field of alternating current from leaking outside.

Besides, a cushion layer may be interposed between the former and the conductor layer. The cushion layer avoids direct contact of metals between the former and the superconducting wire, and consequently prevents the superconducting wire from being damaged. Particularly, when the former is formed in a stranded-wire structure, the cushion layer can function as a means for smoothing the surface of the former. Preferably, the cushion layer may be made of insulation paper or carbon paper.

On the other hand, the core-housing pipe, which is a tubular material for housing a core, has a function of mechanically protecting the core. For example, a corrugated pipe made of stainless steel or aluminum can be used as the core-housing pipe. Basically, this core-housing pipe is not required to exhibit thermal insulation performance for maintaining the coolant temperature of the cable unit, and the thermal insulation function is borne by a thermal insulation member described later. In other words, preferably, the core-housing pipe is not equipped with a thermal insulation layer. With such structure, the outer diameter of the core-housing pipe can be decreased to the practically possible minimum.

However, the core-housing pipe may have a thermal insulation function. In such case, it does not matter whether the thermal insulation structure is vacuum thermal insulation or non-vacuum thermal insulation. When a vacuum thermal insulation structure is adopted for the core-housing pipe, the outer diameter of the cable unit cannot be made smaller as compared with a conventional superconducting cable, but it is not a problem because, if the vacuum performance deteriorates, the thermal insulation property of the cable unit is maintained independently by the thermal insulation member described later or by combination of the thermal insulation property of the core-housing pipe and the thermal insulation property of the thermal insulation member. In order to decrease the outer diameter of the cable part while a vacuum thermal insulation structure is adopted in the core-housing pipe, it is conceivable to make the vacuum degree of the core-housing pipe lower than the vacuum degree of the thermal insulation pipe in a conventional superconducting cable. Also, when a non-vacuum thermal insulation structure is adopted for the core-housing pipe, the thermal insulation property is designed to be lower than the thermal insulation property that is needed for maintaining the coolant temperature of the cable unit. In such case, the non-vacuum thermal insulation structure of the core-housing pipe can be simplified, and the necessary thermal insulation property for maintaining the coolant temperature of the cable unit can be secured by the combination of the non-vacuum thermal insulation structure of the core-housing pipe and the thermal insulation member mentioned hereinlater.

<Thermal Insulation Member>

A thermal insulation member which is maintained in a non-vacuum condition is arranged outside such core-housing pipe. The thermal insulation member is basically required to have thermal insulation performance of maintaining the coolant temperature of the cable unit. The structure of the thermal insulation member is preferably at least either one of a multi-layer thermal insulation and a filling thermal insulation. As for the multi-layer thermal insulation, the so-called super insulation (which is made by laminating a metal foil and plastic meshes) which is also used in a conventional superconducting cables can preferably be used. On the other hand, the filling thermal insulation may preferably use glass wool, expandable plastics, sand, gravel, etc.

Particularly, aerojel is a desirable material for the thermal insulation member. The aerojel, which is a porous material including a number of very minute nano-size vacancies, has high adiabaticity. For example, silica aerojel has many vacancies of 10 nm in average and very high adiabaticity with the coefficient of thermal conductivity being 10 mW/m-K (38° C., 1 atm), and moreover, it is remarkably light-weight. An example of aerojel that can be used is Pyrogel™ from Aspen Aerogels, Inc.

By using either of a multi-layer thermal insulation and a filling thermal insulation independently, or by using both of them in combination, for a thermal insulation member, it is possible to obtain superconducting cables which comply with various required characteristics. Generally, the multi-layer thermal insulation can cover a cable unit in such a manner as winding, and hence it is easy to make the outer shape of the multi-layer thermal insulation in a circular cylindrical form. On the other hand, the filling thermal insulation, which has high degree of freedom in terms of material characteristics and outer shape, can allow choosing various materials and outer shapes, thereby enabling selection according to installation conditions, allowable size, and allowable cost. For example, it is desirable that the multi-layer thermal insulation be disposed on the inner circumferential part of the thermal insulation member, with the filling thermal insulation being disposed on the outer circumferential part of the thermal insulation member. By arranging the multi-layer thermal insulation on the inner circumference side, mainly radiant heat can effectively be insulated, and thereby high thermal insulation property can be obtained. By arranging the filling thermal insulation on the outer peripheral side, it is made possible to select a suitable outer shape of the superconducting cable according to the installation conditions.

<Sealing Member>

The above-mentioned thermal insulation member is arranged outside the cable unit and is sealed up with a sealing member. The sealing member has the function of preventing the permeation of moisture into the thermal insulation member and thereby maintaining the thermal insulation property of the thermal insulation member. Also, the thermal insulation member, which is a multi-layer thermal insulation or a filling thermal insulation as mentioned above, has a difficulty in maintaining a given shape by itself, and hence the sealing member has a function of maintaining the thermal insulation member in a predetermined shape so as not to come apart.

The sealing member is comprised of a material which can prevent the permeation of moisture. For example, a metallic pipe, metallic sheet, or a laminated material made of metallic sheet and plastic sheet, etc. can preferably be used. These metallic sheets and laminated materials cover the outer periphery of the thermal insulation member, and prevent the permeation of moisture by jointing the mutual edges of the sheets by means of welding or adhesion. Aluminum, aluminum alloy, stainless steel, etc. can preferably be used for the metallic pipe and the metallic sheet.

<Arrangement of a Plurality of Cable Units>

The above-mentioned superconducting cable may have either a single cable unit or a plurality of cable units. In the case of a plurality of cable units, preferably the cable units are arranged at positions close to each other. Particularly, it is preferable to arrange a plurality of cable units at positions close to each other within a common thermal insulation member. The contact area (per single cable unit) between the cable unit group and the thermal insulation member is smaller in the case where a plurality of cable units are closely placed altogether in the thermal insulation member as compared with the case where a plurality of cable units are each placed independently in the respective thermal insulation member. Therefore, the amount of penetrating heat per cable unit can be decreased. Particularly, it is possible for each cable unit to cool the other adjacent cable unit mutually, and accordingly more effect of the thermal insulation can be expected.

Ideally, the intervals between the respective cable units are zero, that is, the cable units are in contact with each other. In the case of an interval existing between the cable units, preferably it should be equal to or less than the outer diameter of the cable unit. Choosing such an interval results in reduction of heat penetration per cable unit. More preferably, the interval between the cable units is equal to or less than half the outer diameter of the cable unit.

<Composition of Coolant Transport Tube>

Besides, a coolant transport tube may be provided near a cable unit. The coolant transport tube as mentioned herein is a duct used for transporting various kinds of coolants. Typically, the duct is a transport tube used for liquid-hydrogen, liquid oxygen, liquid-nitrogen or liquid natural gas, etc. These coolant transport tubes, which are generally used for transporting a coolant having a cryogenic temperature used at a hydrogen station or various kinds of plants, are capable of performing thermal insulation (cooling) of the cable unit more efficiently if they are arranged near the cable unit in the thermal insulation member.

The coolant transport tube is placed preferably near the cable unit as in the case where a plurality of cable units are arranged. In this case it is also desirable to make an interval the same as a mutual interval of the cable units. In other words, the coolant temperature of the coolant transport tube can be expected to cool the cable unit near the coolant transport tube in particular when the coolant temperature of the coolant transport tube is lower than the coolant temperature for cooling the superconductor layer of the cable unit.

However, depending on the relationship between the coolant temperature which cools the superconductor layer of the cable unit and the coolant temperature of the coolant transport tube, an auxiliary thermal insulation structure may be provided at least at either one of the cable unit and the coolant transport tube. The auxiliary thermal insulation structure is a thermal insulation structure for preventing the respective coolant of the cable unit and the coolant transport tube from falling out of the range of proper temperature mainly by the mutual heat movement between the cable unit and the coolant transport tube.

For example, in the case where the coolant of the cable unit is liquid-nitrogen (boiling point: about 77 K, melting point: about 63 K), and the coolant of the coolant transport tube is liquid-hydrogen (boiling point: about 20 K), the liquid-nitrogen of the cable unit might be so excessively cooled as to be solidified, or the liquid-hydrogen of the coolant transport tube might be so warmed as to vaporize, if the cable unit and the coolant transport tube are disposed mutually too close. Therefore, it is preferable to provide the cable unit with an auxiliary thermal insulation structure, for example, in order to restrain the liquid-nitrogen of the cable unit from being excessively cooled more than necessary, or to restrain the liquid-hydrogen of the coolant transport tube from being warmed up. Particularly, it is preferable that the thermal insulation structure be designed such that the thermal amount with which a cable unit is warmed up by the penetrating heat from the outside is balanced with the thermal amount with which the cable unit is cooled by cold from the coolant transport tube, so that both the cable unit and the coolant transport tube can easily maintain the proper temperature.

Besides, in the case where the coolant of the cable unit is liquid-nitrogen (boiling point: about 77 K, melting point: about 63 K) and the coolant of the coolant transport tube is liquid natural gas, LNG (boiling point: about 110 K, melting point: about 90 K), depending on the structure of, and the distance between the cable unit and the coolant transport tube, the liquid-nitrogen of the cable unit might be so warmed as to vaporize or the liquid natural gas might be so excessively cooled as to be solidified. Therefore, it is preferable that the coolant transport tube be equipped with an auxiliary thermal insulation structure so that the liquid-nitrogen of the cable unit may be restrained from warming up or a liquid natural gas may be prevented from being excessively cooled more than necessary. Particularly, it is preferable that the thermal insulation structure be designed such that the thermal amount with which the coolant transport tube is warmed up by the penetrating heat from the outside is balanced with the thermal amount with which the coolant transport tube is cooled by cold from the cable unit, so that both the cable unit and the coolant transport tube can easily maintain the proper temperature.

The auxiliary thermal insulation structure to be provided for the cable unit or the coolant transport tube may also be either a vacuum thermal insulation structure or a non-vacuum thermal insulation structure. When the auxiliary thermal insulation structure is provided for the cable unit, the core-housing pipe which comprises the cable unit may be structured as a thermal insulation layer itself, or a thermal insulation layer may be formed outside the housing which comprises the cable unit. Various kinds of known materials can be used as a thermal insulation material for the auxiliary thermal insulation structure, provided that necessary thermal insulation characteristics be satisfied.

<Duct>

It is preferable that at least either one of a cable unit and a coolant transport channel be housed in a duct the outside of which is covered with a thermal insulation member. Housing the cable unit in the duct makes it possible to manufacture "the cable unit or the coolant transport tube" and "an assembly of the duct, a thermal insulation member and a sealing member" separately. Thus, in a subsequent manufacturing process, a superconducting cable can be structured by inserting the cable unit or the coolant transport tube into the duct, and thereby the efficiency in the manufacture and construction of the cable can be increased. Particularly, by inserting a cable unit or a coolant transport tube into the corresponding duct respectively, the cable unit and the coolant transport tube can be installed independently. In such case, since a duct is provided for each cable unit or coolant transport tube, it is possible to easily replace a thing housed in the duct.

It is desirable to make the duct to have airtight structure. For example, at both ends of the duct which houses a cable unit, at least a gap between the duct and either the cable unit or the coolant transport tube should be airtightly sealed. In such case, it is desirable for the pipe housing the cable unit to have a vacuum thermal insulation structure. When the inside of the duct is made airtight and the housing pipe of the vacuum sealing structure is used, it is possible to restrain the decrease in the thermal insulation performance of the housing pipe even if the vacuum sealing structure of the housing pipe is broken. Particularly, it is preferable to evacuate the inside of the duct after sealing both ends of the duct. With this structure, since the inside of the duct is maintained in a vacuum state, it is possible to more effectively restrain the thermal insulation performance of the cable unit from deteriorating even if the vacuum sealing structure of the housing pipe is broken.

<Installation Mode of the Superconducting Cable>

Any installation mode can be used for laying a superconducting cable of the present invention: laying underground or in a concrete, installing in the air, or placing on the ground surface, etc. Particularly, laying underground or in a concrete enables the superconducting cable to exhibit more efficient thermal insulation performance since the earth around the superconducting cable has a thermal insulation function.

<The Kind of the Superconducting Cable>

The superconducting cable of the present invention can be used as either of a direct current (DC) cable and an alternating current (AC) cable. Particularly, with the DC cable, since there is no alternating current loss and the loss is only due to penetrating heat, it is possible to construct a power cable line in which the loss is minimized by the efficient thermal insulation of the thermal insulation member.

<Advantageous Effect of the Invention>

The superconducting cable of the present invention provides the following effects.

(1) By arranging a thermal insulation member maintained in a non-vacuum condition outside a cable unit, a predetermined thermal insulation property can be maintained without adopting a vacuum thermal insulation structure. Thus, it is unnecessary to perform the maintenance and control of the vacuum performance as required in the case of a conventional superconducting cable. Accordingly, the following effects can be expected, for example: (A) the structure of the superconducting cable can be simplified; (B) a reduction of the cable cost can be achieved; (C) it is possible to avoid such a situation as in the case of a conventional superconducting cable, in which the power transmission stops due to the malfunction of the vacuum performance of the thermal insulation pipe.

(2) By equipping the thermal insulation member with a sealing member, it is made possible to prevent the permeation of moisture into the thermal insulation member, thereby maintaining the thermal insulation property of the thermal insulation member.

(3) Since the thermal insulation member bear the thermal insulation function, the cable unit itself is not required basically to have a thermal insulation function, and it is possible to decrease the diameter of the cable unit.

(4) It is possible to construct a superconducting cable line having higher reliability since the thermal insulation member can maintain the thermal insulation property of a cable unit even if a malfunction occurs to the vacuum performance when a vacuum thermal insulation structure is adopted for the housing pipe of the cable unit.

BEST MODE FOR CARRYING OUT THE INVENTION

Hereinafter, preferred embodiments of the invention will be described.

Example 1

First, a superconducting cable of the present invention will be described, using a case of underground installation as an example. FIG. 1 is a schematic drawing showing the underground installation conditions of a superconducting cable of the present invention in Example 1.

This superconducting cable has, as shown in FIG. 1, a cable unit 100, a thermal insulation member 200 covering the cable unit 100, and a sealing member 300 covering the thermal insulation member 200, and is laid underground inside the earth G.

Figure 2:
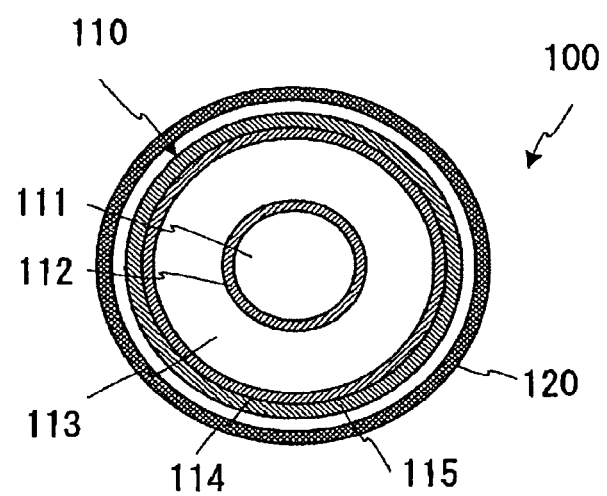
FIG. 2 is a cross-sectional view of the cable unit comprising a superconducting cable of Example 1.

The single core superconducting cable member 100 has a former 111, a superconductor layer 112, an electrical insulation layer 113, a shielding layer 114, a protective layer 115, a core-housing pipe 120 in the enumerated order from the center as shown in FIG. 2. Of these composition members, the items including the former 111 through the protective layer 115 constitute a core 110, and the core 110 is housed in the core-housing pipe 120. A superconducting wire is used in the conductor layer 112 and the shielding layer 114. The superconducting wire used in the cable unit 100 is maintained in a superconducting state by circulating a coolant (in this case: liquid-nitrogen) in the space between the core 110 and the core-housing pipe 120.

The former 111 was made stranding a plurality of insulated copper wires. By adopting the stranded-wire structure for the former 111, both the reduction of alternating current loss and the restraining of temperature rise due to an excess current can be achieved at the same time. In this example, the unevenness caused by a trench due to stranding and appearing at the outer circumferential surface of the former 111 is decreased to the practically possible minimum extent by designing the strands arranged on the outer peripheral side to be thinner than the strands on the central side.

The superconductor layer 112 was formed using Bi-2223-based Ag—Mn sheathed tape wires having a thickness of 0.24 mm and a width of 3.8 mm. The tape wires were wound around the former in multiple layers so as to form the superconductor layer 112. In the conductor layer 112, the winding pitches of the superconducting wires differ from layer to layer. In addition, the winding direction is changed by each layer or a plurality of layers, and thereby it is made possible to cause the electric current to flow uniformly through each layer.

The electrical insulation layer 113 is formed on the outer periphery of the superconductor layer 112. This electrical insulation layer 113 can be formed using, for example, an insulation tape made by laminating kraft paper and a plastic film such as polypropylene (PPLP: registered trademark, from Sumitomo Electric Industries, Ltd.).

The shielding layer 114 is provided on the electrical insulation layer 113. The shielding layer 114 is formed by winding the same kind of superconducting wire as that used for the conductor layer 112. By leading an electric current to this shielding layer 114 in the opposite direction substantially at the same size as the conductor layer 112, thereby offsetting the magnetic field which occurs from the conductor layer 112, it is possible to prevent the magnetic field from leaking outside.

Moreover, the protective layer 115 is formed by winding kraft paper on the shielding layer 114. This protective layer 115 mainly protects the shielding layer 114 mechanically and electrically insulates it from the core-housing pipe 120.

The core 110 which comprises the above-mentioned components, i.e., items including the formers 111 to the protective layer 115, is accommodated in the core-housing pipe 120. In this case, a corrugated pipe made of stainless steel is used for the core-housing pipe 120. A coolant for cooling a superconducting wire is circulated in the core-housing pipe 120. The core-housing pipe 120 is neither of double-pipe structure nor equipped with a thermal insulation structure for maintaining the coolant at cryogenic temperature.

The thermal insulation member 200 is arranged in such a manner as to cover the circumference of the above-mentioned core-housing pipe 120 (FIG. 1). Here, glass wool was used as the thermal insulation member 200. This thermal insulation member 200 is provided in a thickness which is capable of the thermal insulation property necessary for allowing the coolant in the cable unit to maintain cryogenic temperature. In this example, the thermal insulation member 200 is arranged in a manner such that the sectional shape is substantially rectangular. This sectional shape, which may be determined according to the conditions of the installation site and the like, is not limited to the rectangular form, and it may be circular or other form.

Moreover, the outer periphery of the thermal insulation member 200 is covered with the sealing member 300. The sealing member 300 prevents moisture from permeating into the thermal insulation member. In this example, the sealing member was made by winding a stainless sheet around the outer periphery of the thermal insulation member 200 and joining the edge of the sheet by welding.

In the superconducting cable having such composition, it is unnecessary to perform the maintenance and control of the vacuum because no vacuum thermal insulation layer is used. Also, in a conventional superconducting cable, there may occasionally be a situation where power transmission stops if a malfunction occurs to the thermal insulation property of the vacuum thermal insulation layer. However, in the cable of the present invention, such situation can be avoided. Moreover, by using a sealing member, the thermal insulation performance of the thermal insulation member can be maintained for a long period.

As a modification of this example, a silica aerojel may be used instead of the above-mentioned thermal insulation member 200. As for the silica aerojel, Pyrogel (trade name) of Aspen Aerogels Inc., of the U.S.A., or the like may be used. With the silica aerojel, it is possible to make the thickness of the thermal insulation member 200 thinner as compared with the other materials since the silica aerojel has not only a light weight but also an excellent thermal insulation property.

Example 2

Figure 3:
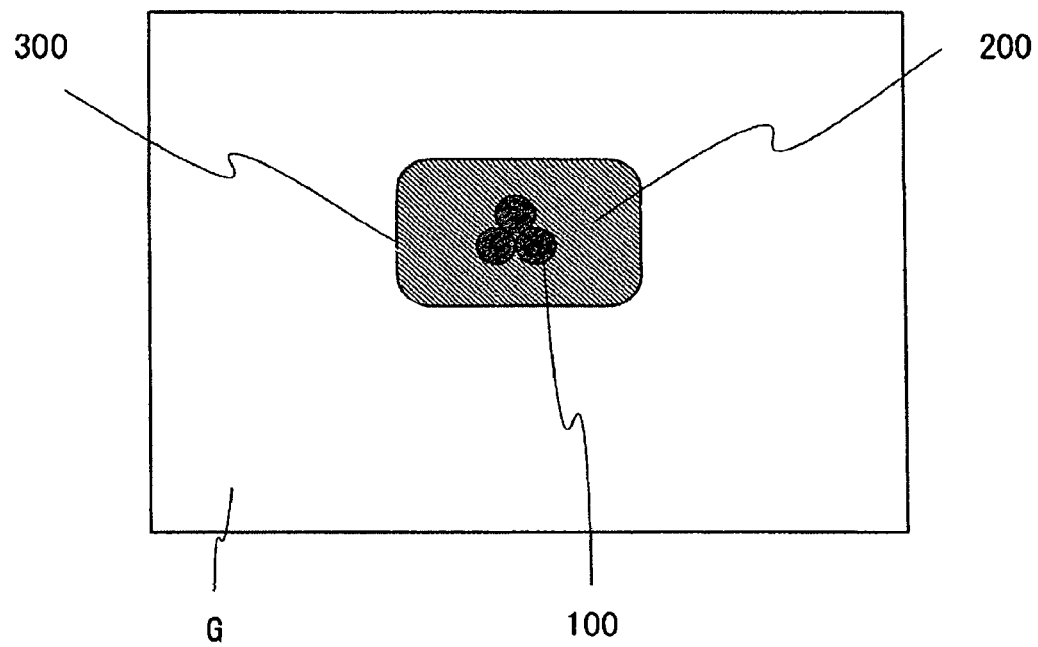
FIG. 3 is a schematic drawing showing the underground installation conditions of a superconducting cable of the present invention of an Example 2.

In the following described is a superconducting cable of the present invention in which a plurality of cable units are used. FIG. 3 is a schematic drawing showing underground installation conditions of a superconducting cable of the present invention in Example 2. In this example, mainly points of differences as compared with Example 1 will be described, omitting an explanation about the common compositions.

In this example, three cable units 100, which are the same kind as that used in Example 1, are used, and they are arranged in a state of contacting with each other in triangular positions inside a thermal insulation member 200. The thermal insulation member 200 is formed by winding a super insulation around the group of the cable units.

Thus, arranging three cable units 100 at mutually close positions in the thermal insulation member makes it possible to decrease the amount of penetrating heat per cable unit, in addition to the effects which can be obtained in Example 1. This is because the total area of contact between the cable unit group and the thermal insulation member 200 is decreased in the case where the three cable units 100 are arranged in a mutually contacting condition, as compared with the case in which each cable unit 100 is arranged separately in the thermal insulation member 200 and because the cable units can mutually cool.

Example 3

Figure 4:
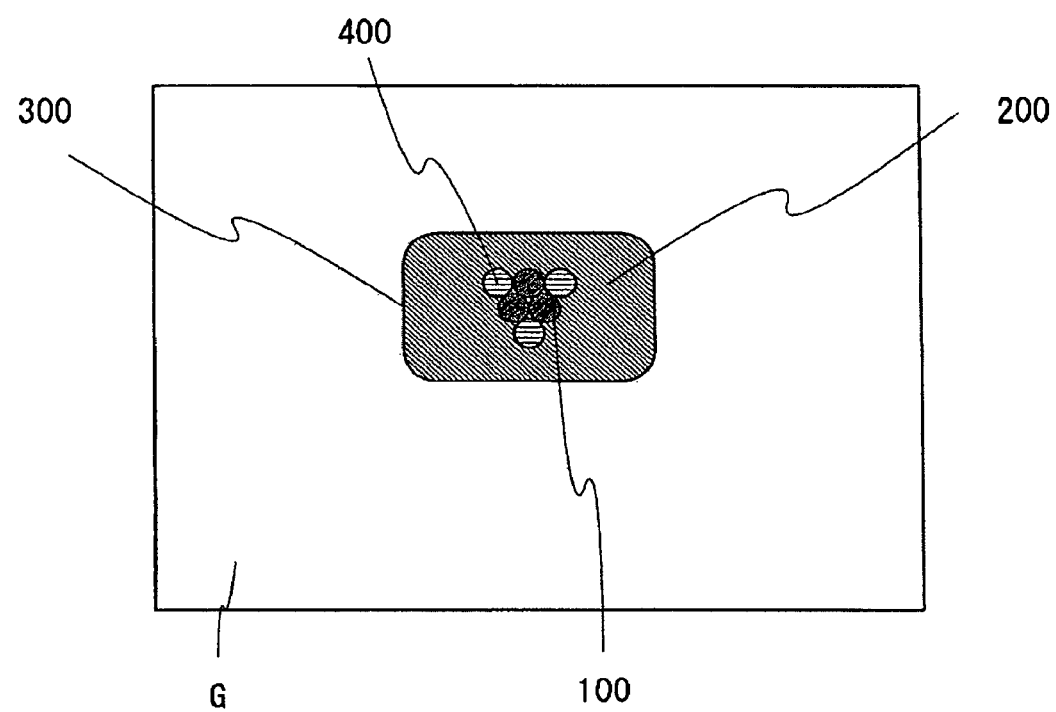
FIG. 4 is a schematic drawing showing the underground installation conditions of a superconducting cable of the present invention of an Example 3.

Next, a superconducting cable of the present invention is described using an exemplary case in which a coolant transport tube is combined with Example 2. FIG. 4 is a schematic drawing showing underground installation conditions of a superconducting cable of the present invention in Example 3. In this example, mainly points of differences as compared with Example 2 will be described, omitting an explanation about the common compositions.

In this example, three coolant transport tubes 400 are arranged each adjacent to the respective three cable units 100, and the cable units 100 and the coolant transport tubes 400 are arranged altogether at positions forming a reversed triangular shape as a whole in the thermal insulation member 200. The coolant transported in the coolant transport tube 400 was liquid hydrogen (coolant temperature: about 20 K).

The amount of penetrating heat per cable unit can be reduced also in the case of this example as in Example 2. In addition, it is possible to cause the coolant transport tube 400 to cool the cable unit 100 because the coolant transport tube 400 is colder than the cable unit 100.

A modification of this example is, for example, to equip the cable unit 100 with an auxiliary thermal insulation structure. When the coolant of the cable unit 100 is liquid-nitrogen (boiling point: about 77 K, melting point: about 63 K) and the coolant of the coolant transport tube 400 is liquid-hydrogen (boiling point: about 20 K), the liquid-nitrogen of cable unit 100 might so excessively be cooled as to be solidified, or the liquid-hydrogen of the coolant transport tube 400 might be so warmed as to vaporize, if the cable unit 100 and the coolant transport tube 400 are disposed too close to each other. If an auxiliary thermal insulation structure is provided for the cable unit 100, it is possible to restrain the liquid-nitrogen of cable unit 100 from being cooled more than necessary or to restrain the liquid-hydrogen of the coolant transport tube 400 from being warmed up. The auxiliary thermal insulation structure may be formed, for example, by providing a plastic outer covering outside the corrugated stainless steel pipe which is a core-housing pipe.

Example 4

Figure 5:
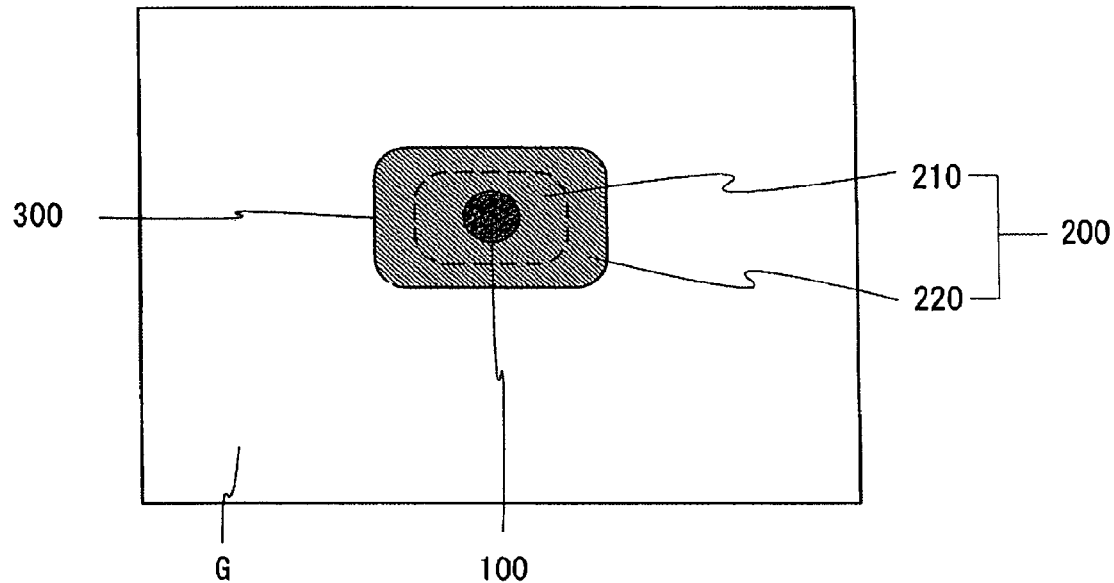
FIG. 5 is a schematic drawing showing the underground installation conditions of a superconducting cable of the present invention of an Example 4.

In the following described is a modification of the superconducting cable of the present invention, in which the composition of the thermal insulation member in Example 1 is changed. FIG. 5 is a schematic drawing showing underground installation conditions of the superconducting cable of the present invention in Example 4. In this example also, mainly points of differences as compared with Example 1 will be described, omitting an explanation about the common compositions.

In this example, a thermal insulation member was comprised of two kinds of materials. That is, a multi-layer thermal insulation 210 is provided on the inner circumferential side near the cable unit, and a filling thermal insulation 220 is provided on the outer peripheral side apart from the cable unit. More specifically, a super insulation is used as the multi-layer thermal insulation 210, and an expandable plastic is used as the filling thermal insulation 220.

By combining the multi-layer thermal insulation 210 and the filling thermal insulation 220, it is made possible to effectively block off both the heat radiation and the heat transmission and to obtain a high thermal insulation property.

Example 5

Figure 6:
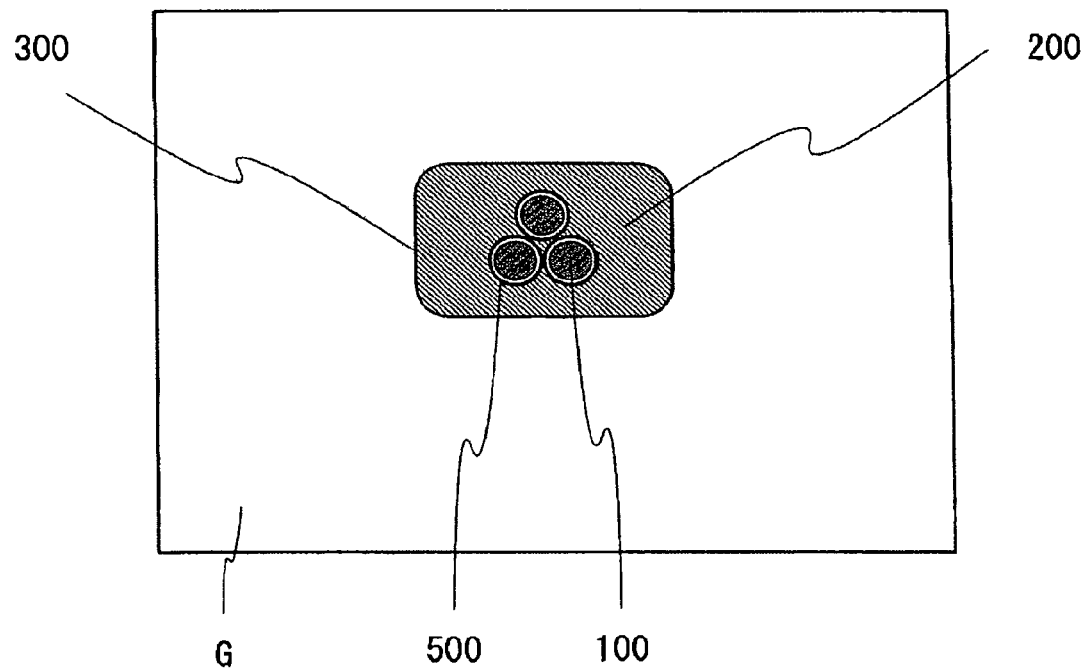
FIG. 6 is a schematic drawing showing the underground installation conditions of a superconducting cable of the present invention of an Example 5.

Next described is a modification of the superconducting cable of the present invention, in which the cable unit of Example 2 is accommodated in a duct. FIG. 6 is a schematic drawing showing underground installation conditions of the superconducting cable of the present invention in Example 5. In this example also, mainly points of differences as compared with Example 2 will be described, omitting an explanation about the common compositions.

In this example, each of three cable units 100 is housed in a duct 500. According to this structure, three cable units 100 are prepared beforehand, and an assembly is separately prepared beforehand, in which a common thermal insulation member 200 is arranged outside three ducts 500 and the outer periphery of the thermal insulation member 200 is covered with a sealing member 300. Thus, a superconducting cable can be obtained by putting each of the cable units 100 into the respective duct 500 in the assembly. Therefore, the installation of the superconducting cable can be made on the unit-by-unit basis.

In an exemplary modification of this example, the core-housing pipe for the cable unit 100 is a vacuum thermal insulation pipe having a double pipe structure, and in addition, the inside of the duct 500 is also evacuated after the ends of the duct 500 have been sealed. According to this structure, the thermal insulation property of the cable unit 100 will not decrease, since the vacuum state of the duct 500 is maintained even if the vacuum sealing of the core-housing pipe is broken. In this case, both the vacuum level of the core-housing pipe and that of the duct may be lower than the vacuum level of the thermal insulation pipe of a conventional superconducting cable. The reason for this is because the thermal insulation property of the cable unit 100 is maintained by the thermal insulation member 200 covering the outside of the cable unit 100.

Example 6

Figure 7:
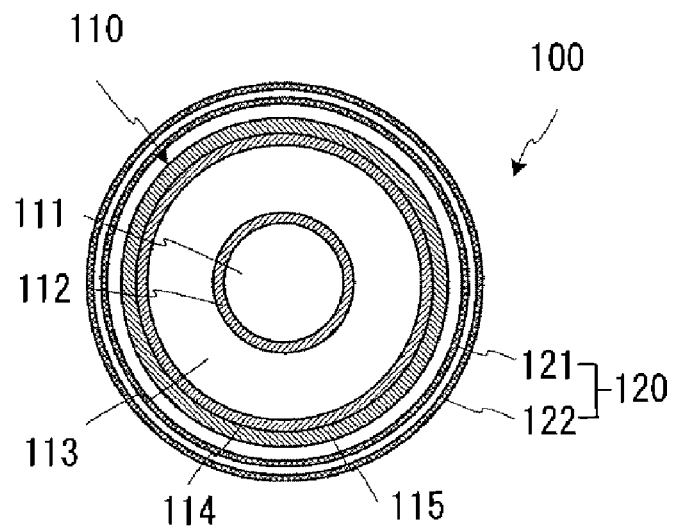
FIG. 7 is a cross-sectional view of the cable unit comprising a single core-type superconducting cable of an Example 6.

Next described is a modification of the superconducting cable of the present invention, in which the structure of the cable unit in Example 1 is changed. FIG. 7 is a cross-sectional view of the cable unit comprising a single core-type superconducting cable in Example 6. In this example also, mainly points of differences as compared with Example 1 will be described, omitting an explanation about the common compositions.

In this example, the core-housing pipe 120 for the cable unit 100 of Example 1 is designed to be a vacuum thermal insulation structure consisting of double pipes. That is, the core-housing pipe 120 has an inner pipe 121 and an outer pipe 122, and a super insulation is arranged between the pipes 121 and 122, and the space therebetween is evacuated.

Figure 8:
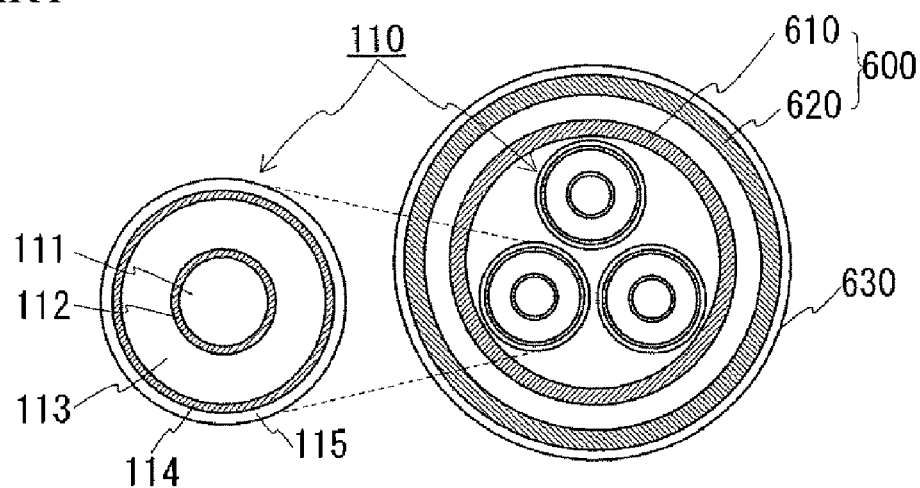
FIG. 8 is a sectional view of a conventional superconducting cable.

According to the structure of this example, the maintenance and control of the vacuum cannot be made unnecessary because a vacuum thermal insulation structure is used in the core-housing pipe 120; however, even if the malfunction occurs with respect to the vacuum performance of the core-housing pipe 120, the thermal insulation performance of the cable unit 100 is maintained by means of the thermal insulation member, and accordingly a superconducting cable line having higher reliability can be built. In this example, an explanation is made about a single core-type superconducting cable; however, in the case of a three-core-in-one type superconducting cable, the cable units may have the same structure as in FIG. 8.

INDUSTRIAL APPLICABILITY

The superconducting cable of the present invention can be used suitably as an electric power transportation means.

DESCRIPTION OF THE REFERENCED NUMERALS 100 cable unit, 110 core, 120 core-housing pipe,
111 former, 112 superconductor layer,
113 electrical insulation layer, 114 shielding layer,
115 protective layer, 121 inner pipe, 122 outer pipe,
200 thermal insulation member,
210 multi-layer thermal insulation,
220 filling thermal insulation, 300 sealing member,
400 coolant transport tube, 500 duct,
600 thermal insulation pipe,
610 inner pipe, 620 outer pipe,
630 anticorrosion layer, G earth

The invention claimed is:

1. A superconducting cable, comprising:
a cable unit comprising a core-housing pipe accommodating a core having a superconductor layer and an electrical insulation layer;
a thermal insulation member located outside the cable unit and maintained in a non-vacuum state; and
a sealing member for preventing permeation of moisture into the thermal insulation member;
the thermal insulation member comprising a multi-layer thermal insulation and a filling thermal insulation;
wherein an inner circumferential part of the thermal insulation member is the multi-layer thermal insulation and an outer peripheral part of the thermal insulation member is the filling thermal insulation.

2. A superconducting cable as set forth in claim 1, wherein a plurality of cable units are arranged at positions close to each other.

3. A superconducting cable as set forth in claim 2, wherein an interval existing between the respective cable units is equal to or less than the outer diameter of the cable unit.

4. A superconducting cable as set forth in claim 1, wherein a coolant transport tube is provided near the cable unit, and wherein the cable unit and the coolant transport tube are covered with the thermal insulation member.

5. A superconducting cable as set forth in claim 4, wherein an interval existing between the cable unit and the coolant transport tube is equal to or less than an outer diameter of the cable unit.

6. A superconducting cable as set forth in claim 4, wherein an auxiliary thermal insulation structure is provided at least at either one of the cable unit and the coolant transport tube.

7. A superconducting cable as set forth in claim 4, wherein at least one of the cable unit and the coolant transport tube is housed in a duct, and wherein the thermal insulation member is arranged on an outer side of the duct.

8. A superconducting cable as set forth in claim 7, wherein a gap between the duct and at least one of the cable unit and the coolant transport tube is airtightly sealed.

9. A superconducting cable as set forth in claim 8, wherein the inside of the duct is evacuated.

10. A superconducting cable as set forth in claim 1 wherein the filling thermal insulation is made of aerojel.

11. The superconducting cable of claim 1, wherein an outer shape of the multi-layer thermal insulation is a cylindrical form with a circular cross-section.

12. The superconducting cable of claim 11, wherein an outer shape of the filling thermal insulation is different from a cylindrical form with a circular cross-section.

13. The superconducting cable of claim 1, wherein an outer surface of the filling thermal insulation is different in shape and size from an outer surface of the multi-layer thermal insulation.

14. The superconducting cable of claim 1, wherein a cross-sectional shape of an outer surface of the filling thermal insulation is different from a cross-sectional shape of an outer surface of the multi-layer thermal insulation.

15. The superconducting cable of claim 1, wherein the multi-layer thermal insulation is in contact with the filling thermal insulation.

16. The superconducting cable of claim 1, wherein the multi-layer thermal insulation comprises a metal foil and plastic meshes that are laminated.

17. The superconducting cable of claim 1, wherein the filling thermal insulation comprises at least one material selected from the group containing glass wool, sand, and gravel.

18. The superconducting cable of claim 1, wherein the filling thermal insulation comprises expandable plastic.

19. The superconducting cable of claim 1, wherein the multi-layer thermal insulation is wound around the cable unit.

20. The superconducting cable of claim 1, wherein the sealing member comprises a laminated material made of a metallic sheet and a plastic sheet.

* * * * *